US008885069B2

(12) United States Patent
Kunishige et al.

(10) Patent No.: US 8,885,069 B2
(45) Date of Patent: Nov. 11, 2014

(54) VIEW ANGLE MANIPULATION BY OPTICAL AND ELECTRONIC ZOOM CONTROL

(75) Inventors: Keiji Kunishige, Hachioji (JP); Koichi Nakata, Kokubunji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 334 days.

(21) Appl. No.: 13/094,671

(22) Filed: Apr. 26, 2011

(65) Prior Publication Data

US 2011/0267503 A1 Nov. 3, 2011

(30) Foreign Application Priority Data

Apr. 28, 2010 (JP) ................................. 2010-104259

(51) Int. Cl.
*H04N 5/262* (2006.01)
*H04N 5/232* (2006.01)

(52) U.S. Cl.
CPC ........... *H04N 5/232* (2013.01); *H04N 5/23296* (2013.01); *H04N 5/23219* (2013.01)
USPC .................................. 348/240.1; 348/240.99

(58) Field of Classification Search
USPC .................... 348/240.99, 240.1, 240.2, 240.3; 396/379
See application file for complete search history.

(56) References Cited

U.S. PATENT DOCUMENTS

| 8,284,273 | B2 * | 10/2012 | Maeda et al. ............... 348/240.1 |
| 2003/0025812 | A1 * | 2/2003 | Slatter ........................ 348/240.2 |
| 2009/0256933 | A1 * | 10/2009 | Mizukami ................... 348/240.1 |
| 2010/0157107 | A1 * | 6/2010 | Iijima et al. ............... 348/240.99 |
| 2010/0277620 | A1 * | 11/2010 | Iijima et al. ................. 348/240.1 |
| 2011/0149120 | A1 * | 6/2011 | Kubota ..................... 348/240.99 |
| 2012/0062769 | A1 * | 3/2012 | Kinoshita et al. .......... 348/240.2 |

FOREIGN PATENT DOCUMENTS

| JP | 06-225196 | 8/1994 |
| JP | 2000-059667 | 2/2000 |
| JP | 2005-033508 | 2/2005 |
| JP | 2006-078638 | 3/2006 |
| JP | 2006-197055 | 7/2006 |
| JP | 2007-329689 | 12/2007 |
| JP | 2008-244804 | 10/2008 |
| JP | 2009-171428 | 7/2009 |

OTHER PUBLICATIONS

Office Action from corresponding Japanese Patent Application No. 2010-104259, mailed Dec. 17, 2013 (2 pgs.), with English translation (3 pgs.).

* cited by examiner

*Primary Examiner* — Tuan Ho
*Assistant Examiner* — Shahbaz Nazrul
(74) *Attorney, Agent, or Firm* — John C. Pokotylo; Straub & Pokotylo

(57) ABSTRACT

Provided is an imaging apparatus including a lens unit having an optical zoom function of collecting light from a subject and optically changing an angle of view, an imaging unit that continuously generates electronic image data using the light collected by the lens unit, an electronic zoom unit that performs electronic zoom by sequentially trimming and enlarging an image corresponding to the image data, a setting unit that sets an enlargement area to be enlarged in the image, a lens manipulation unit that receives a manipulation signal for changing an angle of view, and a control unit that continuously controls, while switching between enlargement of a center of the image by the optical zoom of the lens unit and enlargement of the enlargement area by the electronic zoom of the electronic zoom unit, according to the manipulation signal received by the lens manipulation unit.

17 Claims, 16 Drawing Sheets

FIG.4
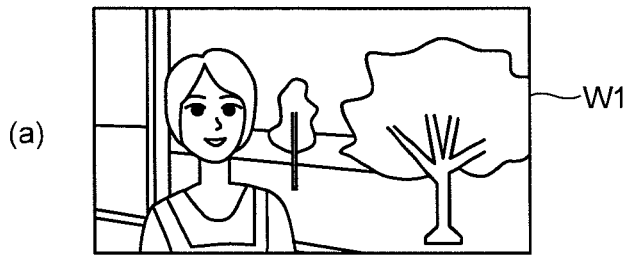
(a)
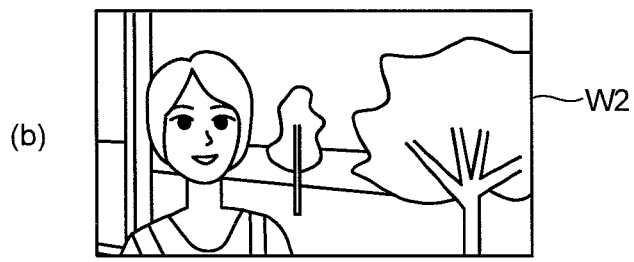
(b)
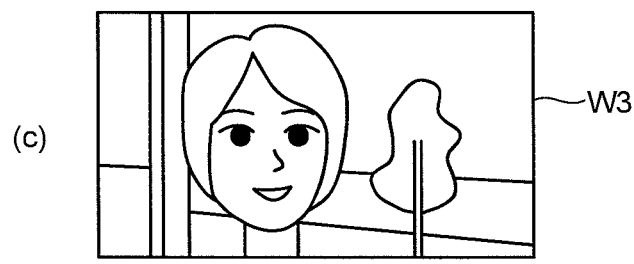
(c)
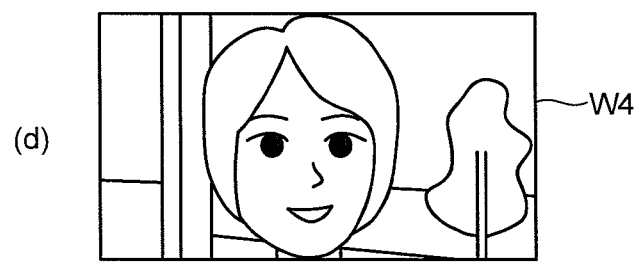
(d)

VIEW ANGLE MANIPULATION BY OPTICAL AND ELECTRONIC ZOOM CONTROL

CROSS-REFERENCE TO RELATED APPLICATION

This application is based upon and claims the benefit of priority from Japanese Patent Application No. 2010-104259, filed on Apr. 28, 2010, the entire contents of which are incorporated herein by reference.

BACKGROUND OF THE INVENTION

1. Field of the Invention

The disclosed embodiments relate generally to an imaging apparatus that generates electronic image data by imaging a subject.

2. Description of the Related Art

In recent years, imaging apparatuses such as digital camera can capture images suitable for various capturing scenes. For example, as for a self-capturing mode in which a user captures oneself as a subject, there is disclosed a technology of preventing user's shooting from ending in failure such that the face of the subject gets out of the composition of a shooting screen (for example, refer to Japanese Laid-open Patent Publication No. 2008-244804). In this technology, it is determined first whether the outline of the face is within the range of the shooting screen when the outline of the face of the subject is detected, and a warning is given to a user by means of sound or the like if the outline of the face is not within the range of the shooting screen at the time of capturing.

SUMMARY OF THE INVENTION

An imaging apparatus according to an aspect of the present invention includes a lens unit that collects light from a subject, the lens unit having an optical zoom function of optically changing an angle of view; an imaging unit that continuously generates electronic image data using the light collected by the lens unit; an electronic zoom unit that performs electronic zoom by sequentially trimming and enlarging an image corresponding to the image data generated by the imaging unit; a setting unit that sets an enlargement area to be enlarged in the image; a zoom manipulation unit that receives a manipulation signal for changing the angle of view through the lens unit; and a control unit that performs continuous control of switching between enlargement of a center of the image by the optical zoom of the lens unit and enlargement of the enlargement area by the electronic zoom of the electronic zoom unit, in accordance with the manipulation signal received by the zoom manipulation unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 shows an example of a screen displayed on a display unit in a zoom-up control process performed in a moving image capturing mode of the imaging apparatus according to the first embodiment of the invention;

DETAILED DESCRIPTION OF THE PREFERRED EMBODIMENTS

First Embodiment

Figure 1:
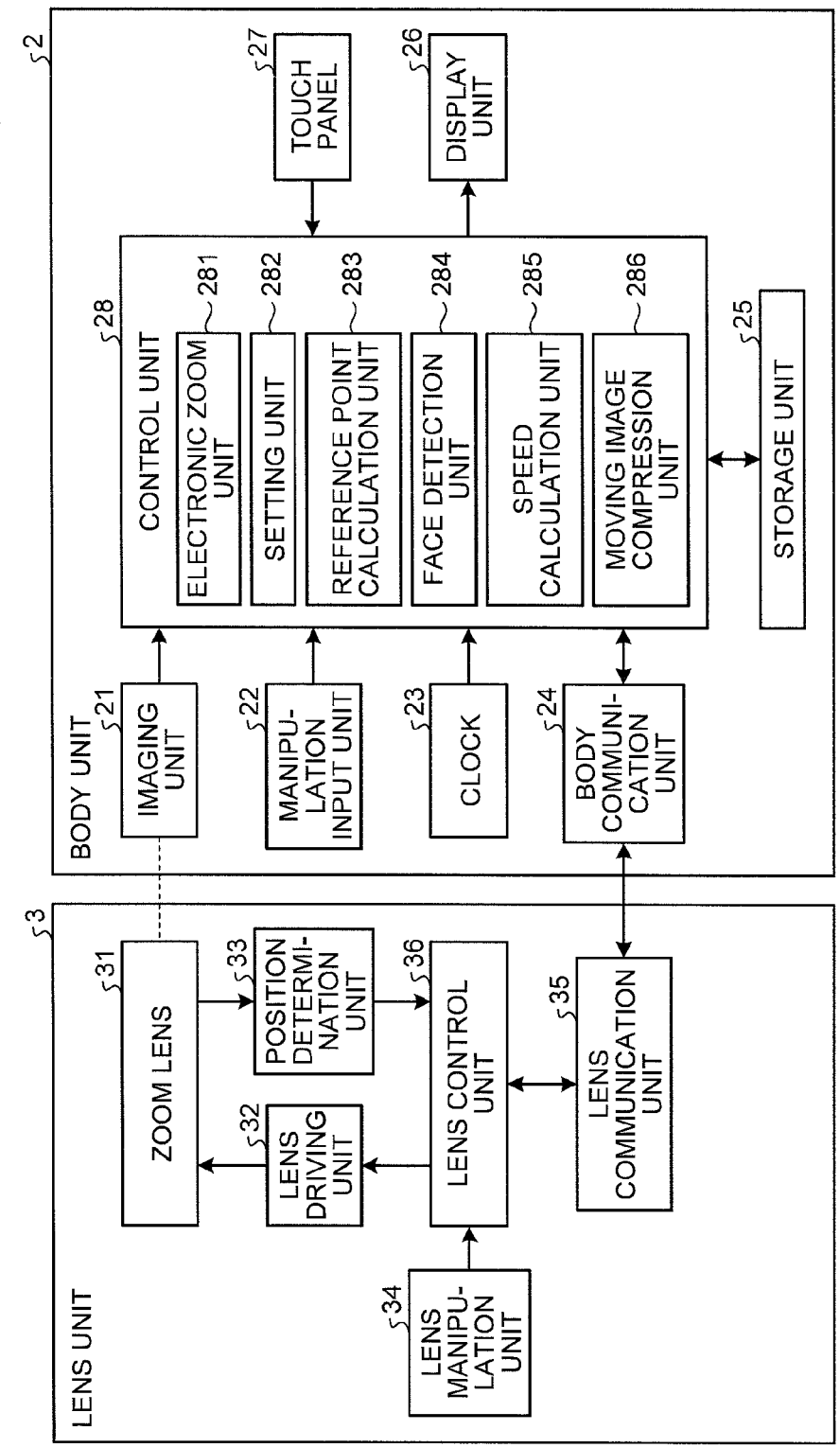
FIG. 1 is a block diagram illustrating the configuration of an imaging apparatus according to a first embodiment of the invention.
Figure 2:
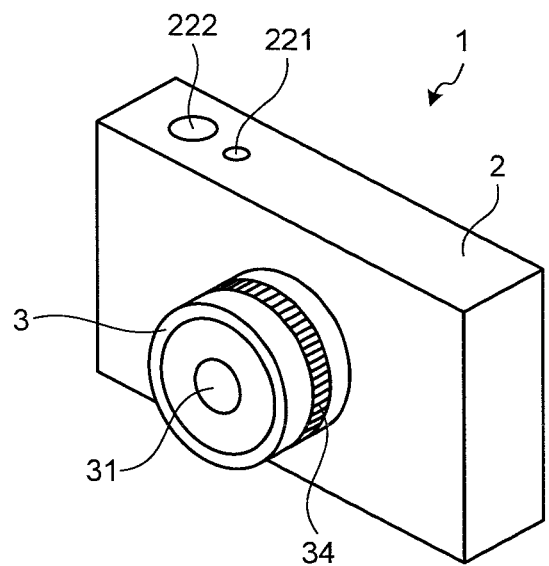
FIG. 2 is a perspective view illustrating the configuration of a front side of the imaging apparatus according to the first embodiment of the invention.
Figure 3:
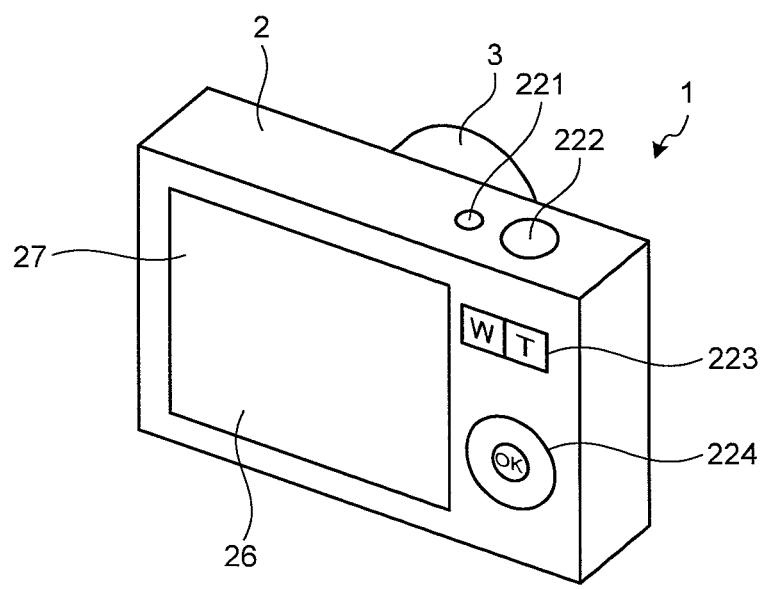
FIG. 3 is a perspective view illustrating the configuration of a rear side of the imaging apparatus according to the first embodiment of the invention.

FIG. 1 is a block diagram illustrating the configuration of an imaging apparatus according to a first embodiment of the invention. FIG. 2 is a perspective view illustrating the configuration of a side (a front side) of the imaging apparatus facing a subject according to the first embodiment of the invention. FIG. 3 is a view illustrating the configuration of a side (a rear side) of the imaging apparatus facing a user according to the first embodiment of the invention. An imaging apparatus 1 illustrated in FIGS. 1 to 3 is a digital single-lens reflex camera, and includes a body unit 2 and a lens unit 3 detachably coupled to the body unit 2.

As illustrated in FIGS. 1 to 3, the body unit 2 includes an imaging unit 21, a manipulation input unit 22, a clock 23, a body communication unit 24, a storage unit 25, a display unit 26, a touch panel 27, and a control unit 28.

The imaging unit 21 includes an imaging element such as a charge coupled device (CCD) that receives light collected by the lens unit 3 and converts the light into an electric signal, and a signal processing circuit that performs signal processing such as amplification with respect to an analog signal output from the imaging element and generates digital image data by performing A/D conversion with respect to the processed analog signal.

As illustrated in FIGS. 2 to 3, the manipulation input unit 22 includes a power switch 221, a release switch 222 that enables input of a release signal for giving a shooting instruction to the imaging apparatus 1, a zoom switch 223 that performs a zoom operation of the lens unit 3, and a setting switch 224 that is used to select various settings of the imaging apparatus 1.

The clock 23 has a determination function of a shooting date or a timer function. The clock 23 outputs date data to the control unit 28 in order to add the date data to the image data generated by the imaging unit 21 when the release switch 222 is manipulated by a user.

The body communication unit 24 is a communication interface for performing communication with the lens unit 3 coupled to the body unit 2. In addition, the body communication unit 24 may be configured to supply power from a power source (not shown) installed at the body unit 2 to the lens unit 3.

The storage unit 25 is realized using a semiconductor memory such as a flash memory or a dynamic random access memory (DRAM) which is fixedly provided to the inside of the imaging apparatus 1. The storage unit 25 records image data and stores information on zoom speeds and lens characteristics according to the type of the lens unit 3 detachably coupled to the body unit 2. In addition, the storage unit 25 may have a function as a recording medium interface of storing information in a storage medium such as a memory card which is mounted from the outside of the imaging apparatus 1, and reading the information stored in the storage medium.

The display unit 26 is realized using a display panel made of liquid crystal or organic electro luminescence (EL). The display unit 26 displays an image corresponding to the image data generated by the imaging unit 21. The display unit 26 appropriately displays manipulation information and capturing-related information of the imaging apparatus 1.

The touch panel 27 is provided to overlap a display screen of the display unit 26 (refer to FIG. 3). The touch panel 27 detects a contact (touch) position of a user based on information displayed on the display unit 26, and receives a manipulation signal as an input according to the contact position. In general, the touch panel is a resistive film-type touch panel, a capacitive-type touch panel, an optical-type touch panel or the like. The first embodiment may adopt any one of the touch panels.

The control unit 28 performs predetermined signal processing with respect to a digital signal output from the imaging unit 21 while controlling the operation of the body unit 2, and is realized using a central processing unit (CPU) and the like. The control unit 28 includes an electronic zoom unit 281, a setting unit 282, a reference point calculation unit 283, a face detection unit 284, a speed calculation unit 285, and a moving image compression unit 286.

The electronic zoom unit 281 performs electronic zoom by trimming and enlarging the image corresponding to the image data generated by the imaging unit 21. The setting unit 282 sets an enlargement area to be enlarged in the image corresponding to the image data generated by the imaging unit 21. Based on a start image, which corresponds to image data generated at the position at which the input of a manipulation signal by a lens manipulation unit 34 (which will be described later) has started, and the enlargement area set by the setting unit 282, the reference point calculation unit 283 calculates a reference point passing through an end portion of an area generated by the imaging unit 21 when the electronic zoom unit 281 starts to operate in the start image. The face detection unit 284 detects the face of a subject, which is included in the image corresponding to the image data generated by generated by the imaging unit 21, through pattern matching and the like. The speed calculation unit 285 calculates the zoom speed of the imaging apparatus 1. The moving image compression unit 286 compresses moving image data captured by the imaging unit 21.

When the reference point has reached the end portion of an image optically zoomed according to the manipulation signal received by the lens manipulation unit 34 (which will be described later), the control unit 28 performs control of stopping optical zoom by the lens manipulation unit 34 to start the operation of the electronic zoom unit 281, and control of generating image data of an image, which employs the enlargement area as the entire area during or after the operation of the electronic zoom unit 281, while moving the enlargement area around the center of the image. Furthermore, in the first embodiment, the setting unit 282 sets an area, which includes a facial area of the subject, which is detected by the face detection unit 284, in the vicinity of the center of the image, as the enlargement area.

In addition, the body unit 2 may have a sound input/output function and a communication function of performing communication through the Internet.

The lens unit 3 includes a zoom lens 31, a lens driving unit 32, a position determination unit 33, the lens manipulation unit 34, a lens communication unit 35, and a lens control unit 36. The zoom lens 31 includes one or a plurality of lenses to collect light from a predetermined viewing area and has an optical zoom function of changing an angle of view. The position determination unit 33 determines a zoom position (an angle of view) of the zoom lens 31. The lens manipulation unit 34 is a zoom ring provided at the periphery of a lens barrel of the lens unit 3 as illustrated in FIG. 2, and receives the input manipulation signal for starting optical zoom operation in the lens unit 3. In addition, although not illustrated in the drawings, the lens unit 3 has a diaphragm for adjusting the incident amount of light collected by the zoom lens 31.

The overview of a zoom-up control process performed in a moving image capturing mode of the imaging apparatus 1 configured as above will be described. FIG. 4 shows an example of a screen displayed on the display unit 26 in the zoom-up control process performed in the moving image capturing mode of the imaging apparatus 1 according to the first embodiment of the invention. In FIG. 4, (a) to (d) illustrate representative four images W1 to W4 among a plurality of images displayed on the display unit 26 when the imaging apparatus 1 performs a zoom operation on a subject in the moving image capturing mode. In addition, between the images W1 to W4, multiple images exist.

As illustrated in FIG. 4, in the case where a user captures a subject by manipulating the lens manipulation unit 34 during moving image capturing while zooming in or out the subject, when a person as the subject does not exist on an optical axis (the center of an image) of the lens unit 3, the subject gets out of a viewing area (image) which is gradually narrowed through the zooming. Therefore, it is normally necessary for a user to perform a zoom operation and a (panning) capturing operation and adjust the capturing direction to be aligned with a subject at the time of capturing, which makes capturing work complicated. As a consequence, a user must have very skill techniques. In this regard, in the first embodiment, when the setting unit 282 sets the area, which includes the facial area of the subject detected by the face detection unit 284 in the vicinity of the center of the image, as the enlargement area, and the reference point has reached the end portion of the image optically zoomed according to the manipulation signal received by the lens manipulation unit 34, the control unit 28 performs the control of stopping optical zooming by the lens unit 3 and of starting electronic zooming by the electronic zoom unit 281, and the control of generating the image data of the image, which employs the enlargement area as the entire area during or after the operation of the electronic zoom unit 281, while moving the enlargement area around the center of the image.

As illustrated in FIG. 4, in the imaging apparatus 1, when a zoom-up operation is performed by the lens manipulation unit 34 according to the instruction of a user during moving image capturing, the control unit 28 moves a subject captured in the left area of an image toward the center of the image while zooming the subject in, thereby generating the image data of the image employing the enlargement area as the entire area ((a) to (d) of FIG. 4). Consequently, when performing a zoom operation in the moving image capturing, it is possible for a user to capture a desired image, for example, a moving image in which a subject is positioned at the center of the image, only by manipulating the lens manipulation unit 34 without aligning the capturing direction to with the subject.

Figure 5A:
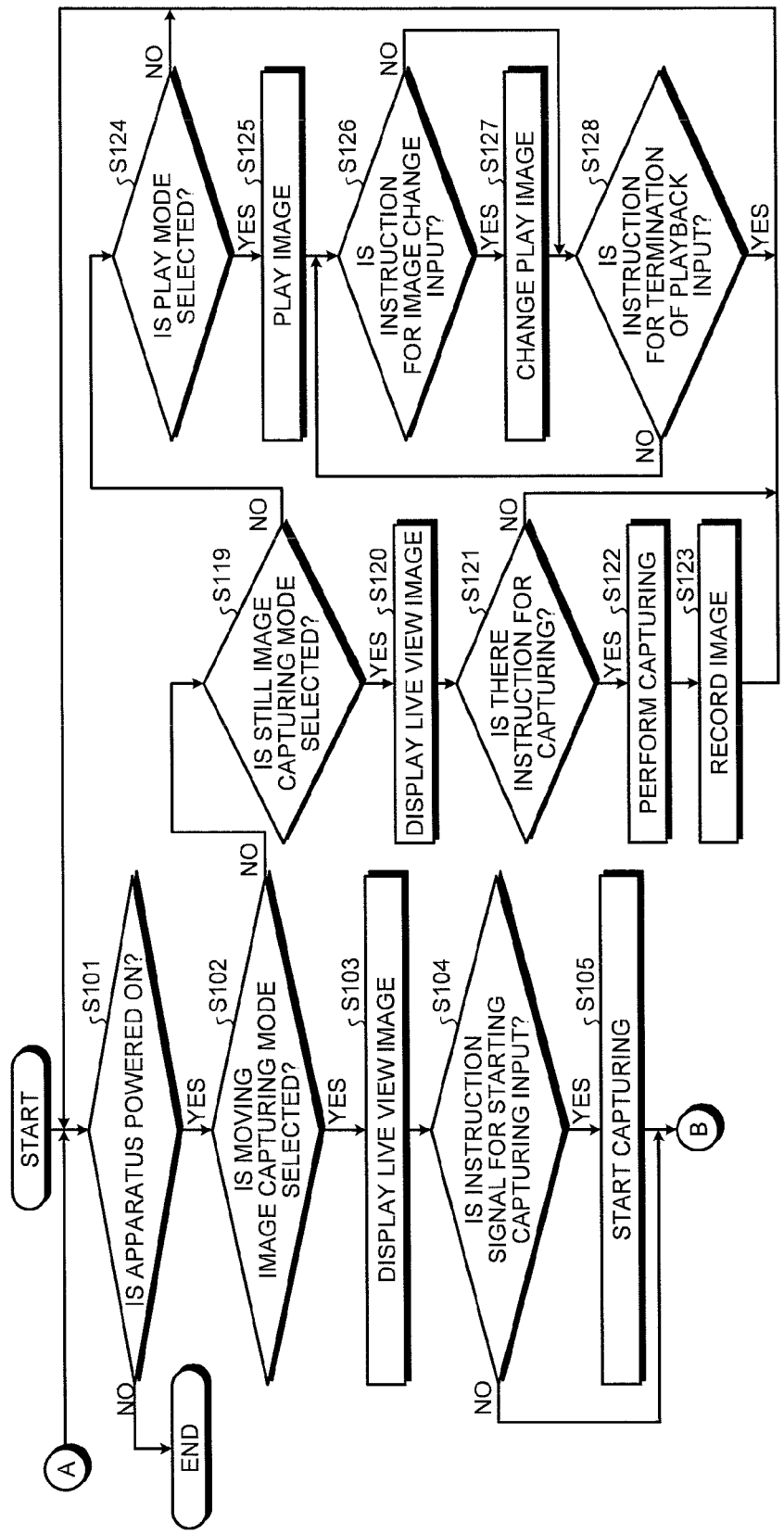
FIGS. 5A and 5B show a flowchart illustrating the overview of processing performed in the imaging apparatus according to the first embodiment of the invention.
Figure 5B:
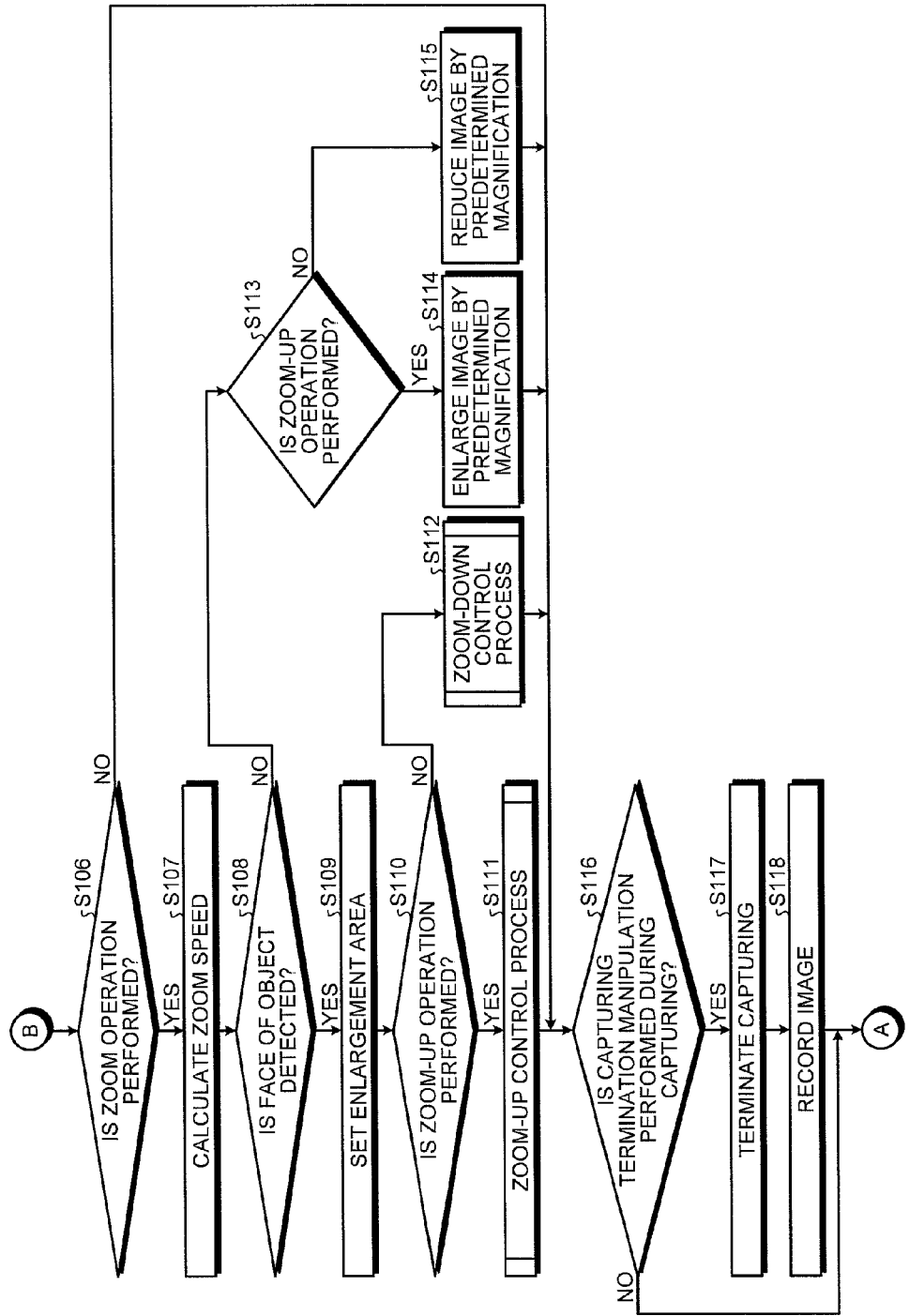

Next, the process performed by the imaging apparatus 1 according to the first embodiment of the invention will be described. FIGS. 5A and 5B show a flowchart illustrating the overview of the process performed by the imaging apparatus 1 according to the first embodiment of the invention.

In FIGS. 5A and 5B, first, in Step S101, the control unit 28 determines whether the imaging apparatus 1 is powered on. When the imaging apparatus 1 is powered on (Yes in Step S101), the imaging apparatus 1 proceeds to perform a process of Step S102. Meanwhile, when the imaging apparatus 1 is not powered on (No in Step S101), the imaging apparatus 1 terminates the current process.

Next, in Step S102, the control unit 28 determines whether the imaging apparatus 1 is set to operate in a moving image capturing mode in which multiple pieces of image data are continuously generated at a constant minute time interval (Step S102). When the imaging apparatus 1 is set to operate in the moving image capturing mode (Yes in Step S102), the imaging apparatus 1 proceeds to perform a process of Step S103. Meanwhile, when the imaging apparatus 1 is not set to operate in the moving image capturing mode (No in Step S102), the imaging apparatus 1 proceeds to perform a process of Step S119.

First, the case where the imaging apparatus 1 is set to operate in the moving image capturing mode (Yes in Step S102) will be described. In such a case, in Step S103, the display unit 26 displays a live view image corresponding to the image data generated by the imaging unit 21.

Next, in Step S104, the control unit 28 determines whether the release switch 222 is pressed by a user and a capturing start instruction signal is input. When the capturing start instruction signal is not input (No in Step S104), the imaging apparatus 1 proceeds to perform a process of Step S106. Meanwhile, when the capturing start instruction signal has been input (Yes in Step S104), the control unit 28 controls the imaging unit 21 to start a capturing operation in Step S105 and the imaging apparatus 1 proceeds to perform a process of Step S106.

Then, in Step S106, the control unit 28 determines whether the lens manipulation unit 34 is operated to zoom in or out by the user through the lens communication unit 35. When the lens manipulation unit 34 is not operated for zooming by the user (No in Step S106), the imaging apparatus 1 proceeds to perform a process of Step S116. Meanwhile, when the lens manipulation unit 34 is operated for zooming by the user (Yes in Step S106), the imaging apparatus 1 proceeds to perform a process of Step S107.

Figure 6:
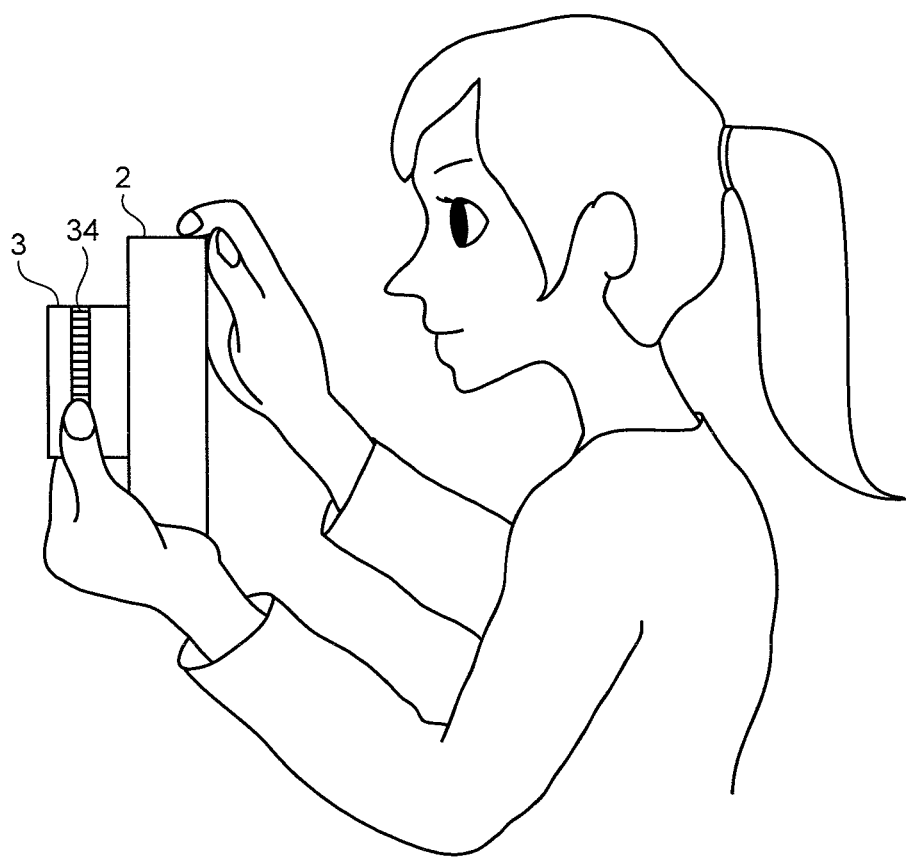
FIG. 6 is a diagram illustrating the state in which a user performs a zoom operation.

FIG. 6 is a diagram illustrating a capturing state of a user when capturing a subject using the imaging apparatus 1. As illustrated in FIG. 6, the user performs a zoom operation while viewing an image displayed on the display unit 26 by supporting the body unit 2 on the right hand and rotating the lens manipulation unit 34 with the left hand. In such a case, it is possible for the user to have a sense of operating a mechanical zoom. In addition, even when holding the imaging apparatus 1 provided with the lens unit 3 having a large interchangeable lens, the user can quickly and intuitively perform a manipulation while supporting the large interchangeable lens. Accordingly, the user can perform an effective zoom operation at the timing as the user expects.

In Step S107, the speed calculation unit 285 calculates the zoom speed of the imaging apparatus 1 based on a manipulation time and a manipulation amount of the lens manipulation unit 34. In detail, under the state illustrated in FIG. 6, the speed calculation unit 285 calculates the zoom speed of the imaging apparatus 1 based on a rotation amount and a manipulation time of the lens manipulation unit 34 by the user.

Then, in Step S108, the control unit 28 determines whether the face detection unit 284 has detected the face of the subject in the image. When the face detection unit 284 has detected the face of the subject in the image (Yes in Step S108), the imaging apparatus 1 proceeds to perform a process of Step S109. Meanwhile, when the face detection unit 284 has not detected the face of the subject in the image (No in Step S108), the imaging apparatus 1 proceeds to perform a process of Step S113.

First, the case where the face detection unit 284 has detected the face of the subject in the image (Yes in Step S108) will be described. In such a case, in Step S109, the setting unit 282 sets an area, which includes the facial area of the subject detected by the face detection unit 284 in the vicinity of the center of the image and the longitudinal length of the face coincides with the longitudinal length of the area, as the enlargement area.

The face detection unit 284 analyzes the pattern of the image in the screen, and determines a portion of the screen, which includes the face, by using shadow information on each part of the face. Furthermore, when many faces exist in the screen, for example, a high priority is given to the centermost face of the screen, the face captured in the largest size or the like.

Then, in Step S110, the control unit 28 determines whether the operation of the lens manipulation unit 34 is a zoom-up operation. When the operation of the lens manipulation unit 34 is the zoom-up operation (Yes in Step S110), the control unit 28 performs a zoom-up control process which will be described later in Step S111). Meanwhile, when the operation of the lens manipulation unit 34 is not the zoom-up operation (No in Step S111), the control unit 28 performs a zoom-down control process which will be described later in Step S112).

Meanwhile, the case where the face detection unit 284 has not detected the face of the subject in the image (No in Step S108) will be described. In such a case, in Step S113, the control unit 28 determines whether the operation of the lens manipulation unit 34 is the zoom-up operation. When the operation of the lens manipulation unit 34 is determined to be the zoom-up operation (Yes in Step S113), in Step S114, the control unit 28 gradually enlarges the image by controlling a zoom magnification of the imaging apparatus 1 to a predetermined magnification, for example, such that an angle of view becomes twice, based on the manipulation amount (the rotation amount) of the lens manipulation unit 34. Meanwhile, when the operation of the lens manipulation unit 34 is not the zoom-up operation (No in Step S113), in Step S115, the control unit 28 gradually reduces the image by controlling the zoom magnification of the imaging apparatus 1 to a predetermined magnification based on the manipulation amount of the lens manipulation unit 34 and the zoom speed calculated by the speed calculation unit 285.

In Step S116, the control unit 28 determines whether a capturing termination manipulation is input when the imaging apparatus 1 performs the capturing operation. When the capturing termination manipulation is input (Yes in Step S116), the control unit 28 controls the imaging apparatus 1 to stop the capturing operation in Step S117 and the imaging apparatus 1 proceeds to perform a process of Step S118. Meanwhile, when the capturing termination manipulation is not input (No in Step S116), the imaging apparatus 1 returns to Step S101.

In Step S118, the control unit 28 records a series of data compressed by the moving image compression unit 286 in the storage unit 25 and returns the imaging apparatus 1 to Step S101.

Next, the case where the imaging apparatus 1 is set to operate in a still image capturing mode (No in Step S102, Yes in Step S119) will be described. In such a case, first, in Step S120, the display unit 26 displays a live view image corresponding to the image data generated by the imaging unit 21.

Next, in Step S121, the control unit 28 determines whether the release switch 222 is pressed and the capturing start instruction signal is input. When the capturing start instruction signal is not input (No in Step S121), the control unit 28 returns the imaging apparatus 1 to Step S101. Meanwhile, when the capturing start instruction signal is input (Yes in Step S121), the imaging apparatus 1 proceeds to perform a process of Step S122.

In Step S122, the control unit 28 captures a current live view image displayed on the display unit 26. In Step S123, the control unit 28 performs processing such as compression with respect to the image data generated by the imaging unit 21 to record the processed data in the storage unit 25, and then the control unit returns the imaging apparatus 1 to Step S101.

Next, the case where the imaging apparatus 1 is set to operate in a play mode (No in Step S102, No in Step S119, Yes in Step S124) will be described. In such a case, first, in Step S125, the control unit 28 reads a predetermined image from the storage unit 25 and controls the display unit 26 to play and display the read image. Here, an initially displayed image, for example, is the latest image.

Then, in Step S126, the control unit 28 determines whether a change instruction signal for instructing a change in the image is input through the manipulation input unit 22. When the change instruction signal for instructing the change in the image is not input (No in Step S126), the imaging apparatus 1 proceeds to perform a process of Step S128. Meanwhile, when the change instruction signal for instructing the change in the image is input (Yes in Step S126), the imaging apparatus 1 proceeds to perform a process of Step S127.

In Step S127, the control unit 28 reads another instructed image from the storage unit 25 and controls the display unit 26 to play and display another image. Then, in Step S128, the control unit 28 determines whether a play termination instruction signal is input through the manipulation of the manipulation input unit 22. When the play termination instruction signal is input (Yes in Step S128), the control unit 28 returns the imaging apparatus 1 to Step S101. Meanwhile, when the play termination instruction signal is not input (No in Step S128), the control unit returns the imaging apparatus 1 to Step S126.

In Step S124, when the imaging apparatus 1 is not set to operate in play mode (No in Step S124), the control unit 28 returns the imaging apparatus 1 to Step S101.

Figure 7:
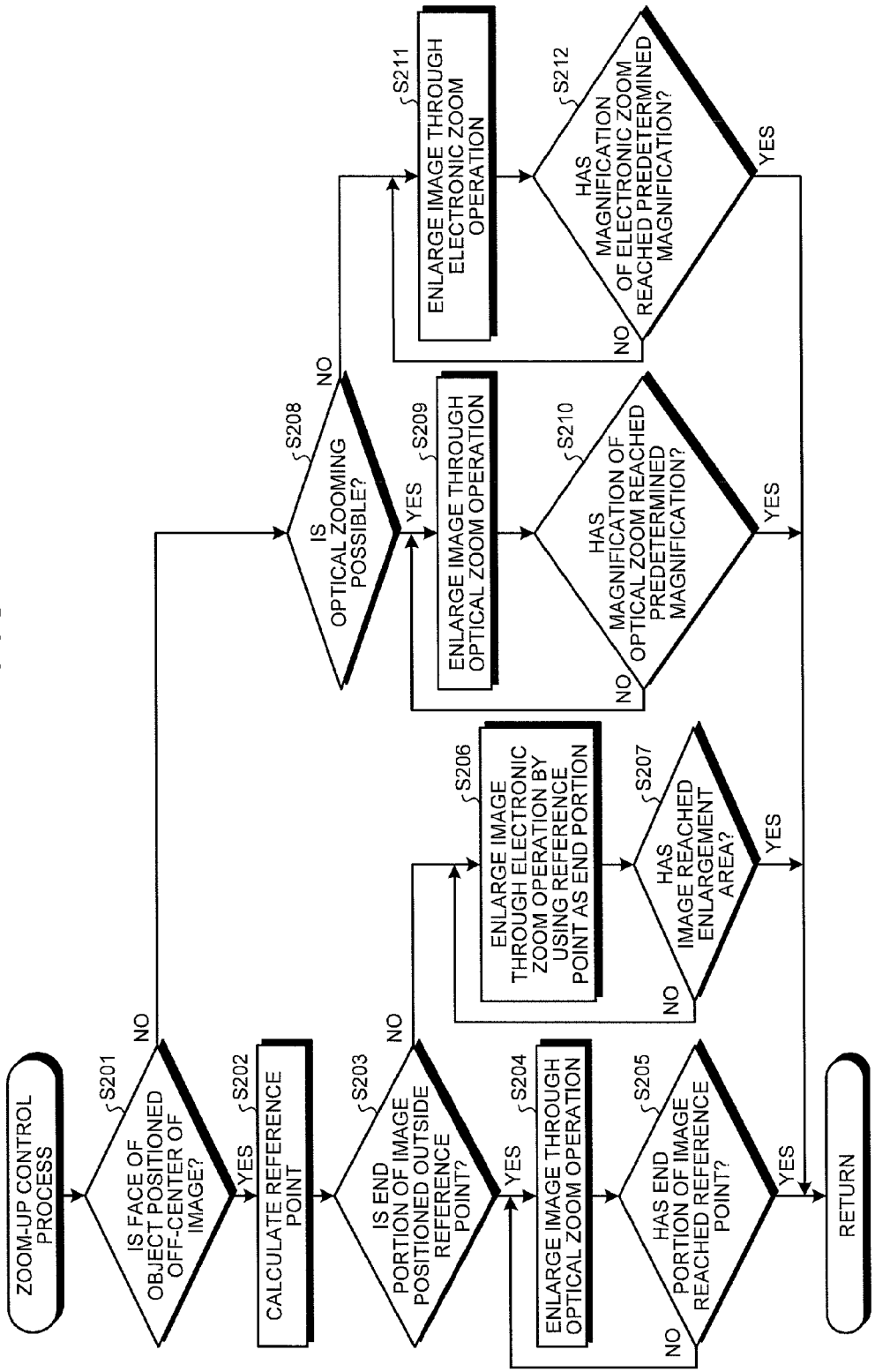
FIG. 7 is a flowchart illustrating the overview of a zoom-up control process performed with the imaging apparatus according to the first embodiment of the invention.
Figure 8:
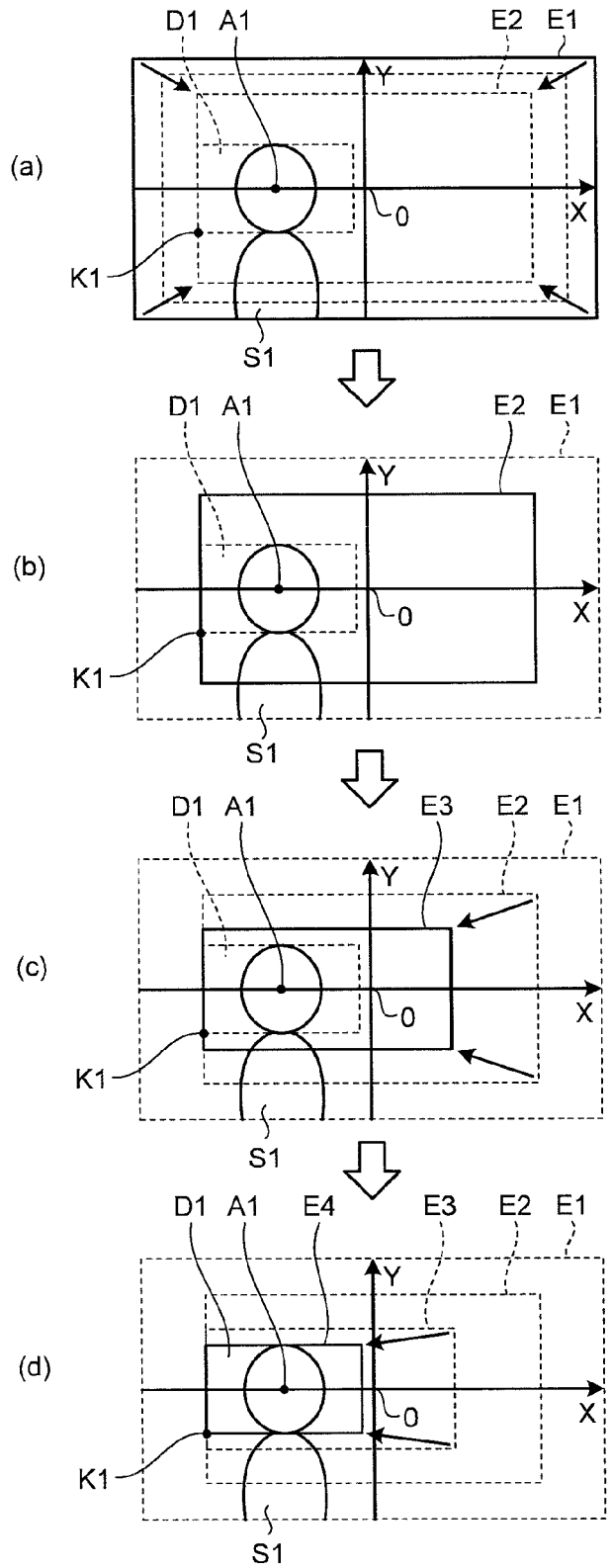
FIG. 8 shows diagrams explaining a zoom-up control process of the imaging apparatus according to the first embodiment of the invention.

FIG. 7 is a flowchart illustrating the overview of the zoom-up control process of Step S111 illustrated in FIGS. 5A and 5B. FIG. 8 shows diagrams explaining the zoom-up control process of the imaging apparatus 1 according to the first embodiment of the invention.

As illustrated in FIG. 7, first, in Step S201, the control unit 28 determines whether the face of the subject detected by the face detection unit 284 is positioned outside the center of the image displayed on the display unit 26. In detail, as illustrated in (a) of FIG. 8, the control unit 28 determines whether the face of a subject S1 detected by the face detection unit 284 is positioned outside the center of a start image E1. When the face of the subject is positioned outside the center of the image displayed on the display unit 26 (Yes in Step S201), the imaging apparatus 1 proceeds to perform a process of Step S202. Meanwhile, when the face of the subject is not positioned outside the center of the image displayed on the display unit 26 (No in Step S201), the imaging apparatus 1 proceeds to perform a process of Step S208.

First, the case where the face of the subject is positioned outside the center of the image displayed on the display unit 26 (Yes in Step S201) will be described. In such a case, in Step S202, based on the start image, which corresponds to the image data generated at the position at which the input of the manipulation signal by the lens manipulation unit 34 has started, and the enlargement area set by the setting unit 282, the reference point calculation unit 283 calculates the reference point passing through the end portion of the area generated by the imaging unit 21 when the electronic zoom unit 281 starts to operate in the start image.

Figure 9:
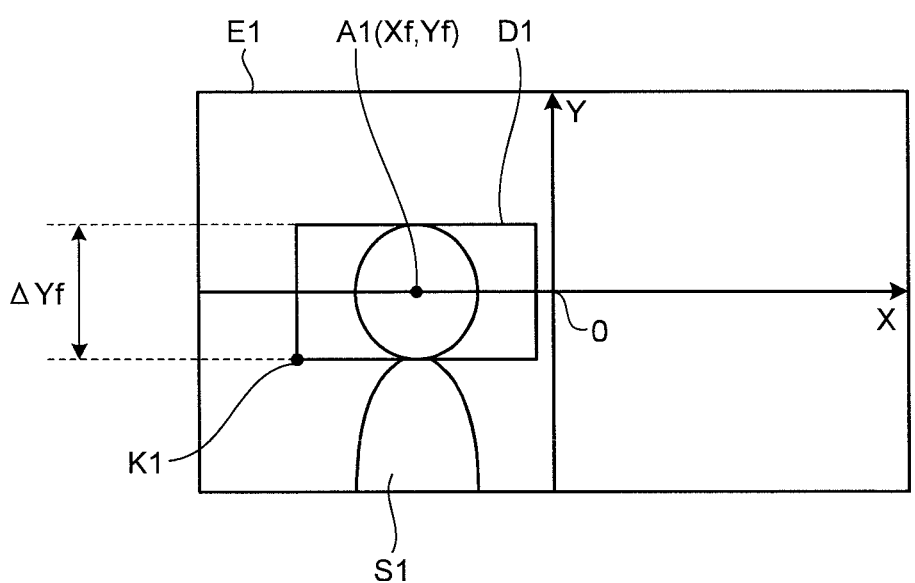
FIG. 9 is a diagram explaining the overview of a calculation method of a reference point calculated by a reference point calculation unit.

FIG. 9 is a diagram explaining the overview of a calculation method of the reference point calculated by the reference point calculation unit 283. As illustrated in FIG. 9, based on the start image E1, which corresponds to the image data generated at the position at which the input of the manipulation signal by the lens manipulation unit 34 has started, and the enlargement area D1 set by the setting unit 282, the reference point calculation unit 283 calculates the reference point K1 passing through the end portion of the area generated by the imaging unit 21 when the electronic zoom unit 281 starts to operate in the start image E1. In detail, the reference point K1 is set as expressed by Equation (1) below.

$$K1 = Xf - \Delta Yf \times (8/9) \tag{1}$$

In Equation (1), Xf of the left side is an X coordinate of a center position A1 of the face of the subject S1 when viewed from a coordinate system in which the center of the start image E1, which corresponds to the image data generated at the position at which the input of the manipulation signal by the lens manipulation unit 34 has started, is set as the origin. Furthermore, $\Delta Yf$ of the right side is the longitudinal length of the face of the subject S1. As for the length $\Delta Yf$, for example, when an aspect ratio is set to 9:16 for the purpose of display on a television and the like, the length $\Delta Yf$ is set such that the lateral (X direction) length of the face of the subject S1 fits within the image of 9:16. Accordingly, when the start image E1 is viewed from the coordinate system, the reference point calculation unit 283 can calculate an X coordinate and a Y coordinate of the reference point K1. So far, the reference point K1 (K1<0) in the case where the subject exists in the left area of the start image E1 has been described. However, when the subject exists in the right area of the start image E1 (K1≥0), the reference point K1 is set as expressed by Equation (2) below.

$$K1 = Xf + \Delta Yfx(8/9) \qquad (2)$$

In addition, the reference point calculation unit 283 relatively calculates a reference point of an image sequentially changed by a zoom operation such that the reference point corresponds to the start image E1 generated at the position at which the input of the manipulation signal by the lens manipulation unit 34 has started. So far, in the calculation method of the reference point, the aspect ratio is 9:16. However, for example, the aspect ratio may be set by the manipulation input unit 22. Moreover, the reference point is positioned at the left lower vertex of the enlargement area. However, for example, the reference point may be positioned at the center or other vertexes of the enlargement area.

In step S203, the control unit 28 determines whether the end portion of an image to be sequentially enlarged according to the manipulation content of the lens manipulation unit 34 is positioned outside the reference point. In detail, as illustrated in (a) of FIG. 8, the control unit 28 determines whether the end portion of the image to be sequentially enlarged from the start image E1 is positioned outside the reference point K1. When the end portion of the image is positioned outside the reference point (Yes in Step S203), in Step S204, the control unit 28 allows the lens unit 3 to perform an optical zoom operation at the zoom speed calculated by the speed calculation unit 285, thereby performing control of gradually enlarging the image corresponding to the image data generated by the imaging unit 21 so that the image may reach a target image E2.

Then, in Step S205, the control unit 28 determines whether the reference point K1 has reached the end portion of the image sequentially enlarged through optical zoom according to the manipulation signal received by the lens manipulation unit 34. In detail, as illustrated in (b) of FIG. 8, the control unit 28 determines whether the reference point K1 has reached the end portion of the image E2. When the reference point K1 has reached the end portion of the image E2 (Yes in Step S205), the control unit 28 controls the lens unit 3 to stop the optical zoom operation, and the imaging apparatus 1 returns to the main routine. Meanwhile, when the reference point K1 has not reached the end portion of the image E2 (No in Step S205), the imaging apparatus 1 returns to Step S204 so that the lens unit 3 performs the optical zoom operation to continuously enlarge the image.

Next, the case where the end portion of the image to be sequentially enlarged according to the manipulation content of the lens manipulation unit 34 is not positioned outside the reference point (No in Step S203) will be described. In such a case, in Step S206, the control unit 28 controls the electronic zoom unit 281 to start to operate, and gradually enlarge the image by allowing the electronic zoom unit 281 to perform an electronic zoom operation at the zoom speed calculated by the speed calculation unit 285 such that the reference point is positioned at the end portion of the image. In detail, as illustrated in (b) to (d) of FIG. 8, the control unit 28 gradually moves the enlargement area to the center of the image by controlling the trimming of the electronic zoom unit 281 such that an image E4 is obtained from an image E2 and an image E3, thereby finally generating image data of an image employing the enlargement area as an entire area. In such a case, a zoom speed of the electronic zoom may correspond to a zoom speed of the optical zoom. Furthermore, the zoom speed of the electronic zoom may be adjusted according to the size of the enlargement area.

Then, in Step S207, the control unit 28 determines whether the image has reached the enlargement area. In detail, as illustrated in (d) of FIG. 8, the control unit 28 determines whether the image E4 has reached the enlargement area D1 set by the setting unit 282 (the enlargement area D1 illustrated in FIG. 9). When the image has reached the enlargement area (Yes in Step S207), the control unit 28 returns the imaging apparatus 1 to the main routine. Meanwhile, when the image has not reached the enlargement area (No in Step S207), the imaging apparatus 1 returns to Step S206 so that the electronic zoom unit 281 performs the electronic zoom operation to continuously enlarge the image. Consequently, when performing the zoom operation during the moving image capturing, a user can capture a moving image, in which the subject has moved at the center of the image, only by manipulating the lens manipulation unit 34 without aligning the capturing direction with the subject.

Next, the case where the face of the subject is not positioned outside the center of the image (No in Step S201) will be described. In such a case, in Step S208, the control unit 28 determines whether optical zoom is possible. When the optical zoom is possible (Yes in Step S208), the imaging apparatus 1 proceeds to perform a process of Step S209. Meanwhile, when the optical zoom is not possible (No in Step S208), the imaging apparatus 1 proceeds to perform a process of Step S211.

In Step S209, the control unit 28 gradually enlarges the image by causing the lens unit 3 to perform the optical zoom operation based on the manipulation amount of the lens manipulation unit 34 and the zoom speed calculated by the speed calculation unit 285. In this situation, the imaging apparatus 1 does not perform the electronic zoom and the face of the subject exists in the center of the image. Therefore, the control unit 28 can capture a moving image, in which the subject is positioned at the center of the image, only by gradually enlarging the subject through a general optical zoom operation.

Then, in Step S210, the control unit 28 determines whether the optical zoom has reached a predetermined magnification. When the optical zoom has reached the predetermined magnification (Yes in Step S210), the control unit returns the imaging apparatus 1 to the main routine. Meanwhile, when the optical zoom has not reached the predetermined magnification (No in Step S210), the imaging apparatus 1 returns to step S209 so that the lens unit 3 performs the optical zoom operation to continuously enlarge the image.

Next, the case where the optical zoom is not possible (No in Step S208) will be described. In such a case, in step S211, the control unit 28 gradually enlarges the image by causing the electronic zoom unit 281 to perform the electronic zoom operation based on the manipulation amount of the lens manipulation unit 34 and the zoom speed calculated by the speed calculation unit 285. In this situation, the subject is positioned at the center of the image and the center of the image is further enlarged through the electronic zoom operation. In detail, the center of the image E4 illustrated in (d) of FIG. 8 is enlarged through the electronic zoom operation. Consequently, it is possible to capture a moving image in which the face of the subject is further enlarged.

Then, in Step S212, the control unit 28 determines whether the electronic zoom has reached a predetermined magnification. When the electronic zoom has reached the predetermined magnification (Yes in Step S212), the control unit 28 returns the imaging apparatus 1 to the main routine. Meanwhile, when the electronic zoom has not reached the predetermined magnification (No in Step S212), the imaging apparatus 1 returns to Step S211 so that the electronic zoom unit 281 performs the electronic zoom operation to continuously enlarge the image.

Figure 10:
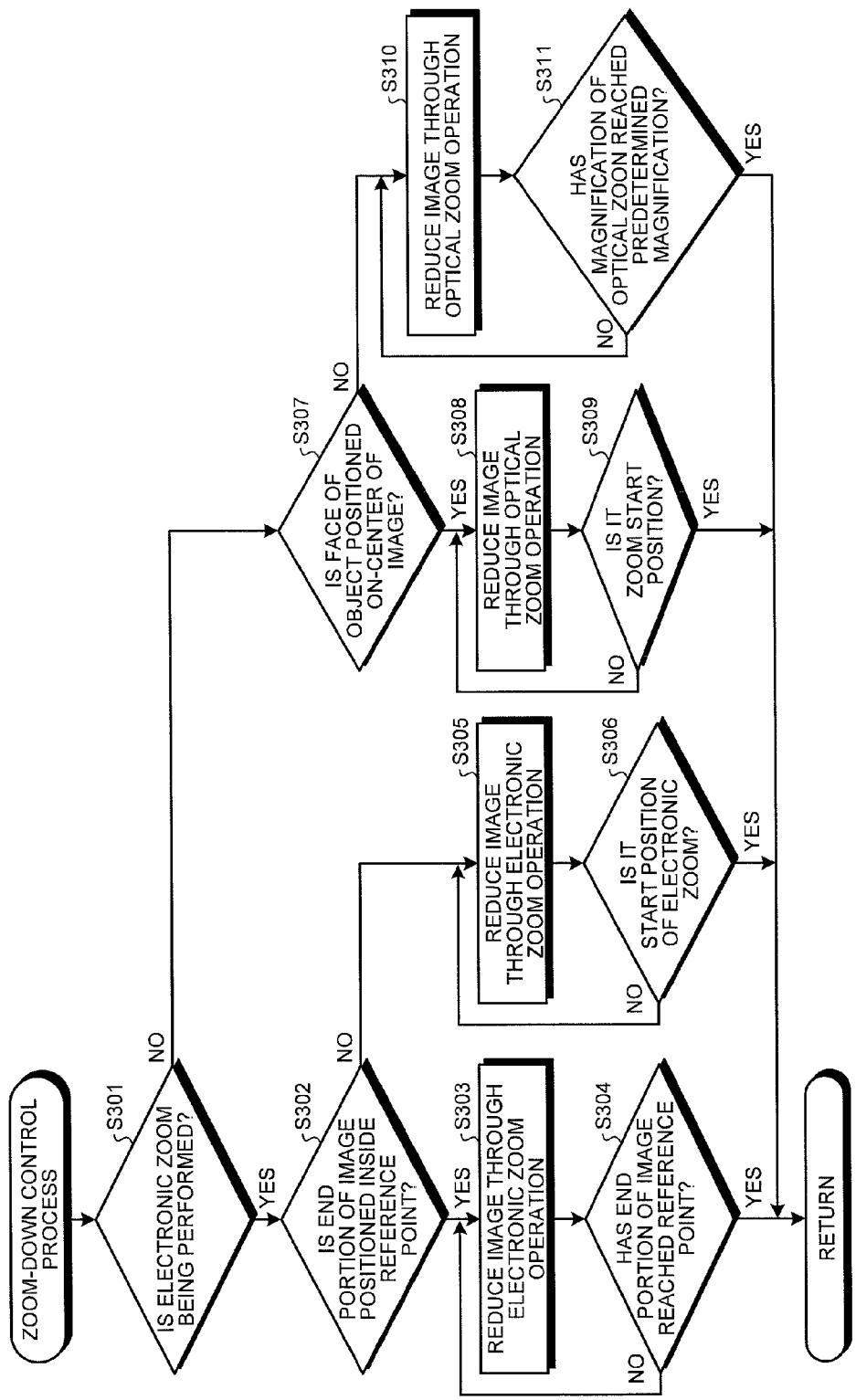
FIG. 10 is a flowchart illustrating the overview of a zoom-down control process performed with the imaging apparatus according to the first embodiment of the invention.

Next, the zoom-down control process of Step S112 illustrated in FIGS. 5A and 5B will be described. FIG. 10 is a flowchart illustrating the overview of the zoom-down control process of Step S112 illustrated in FIGS. 5A and 5B. First, in Step S301, the control unit 28 determines whether the imaging apparatus 1 is performing an electronic zoom operation. In detail, the control unit 28 determines whether the subject is positioned at the center ((d) of FIG. 8) of the image through the zoom-up control process. When the imaging apparatus 1 is performing the electronic zoom operation (Yes in Step S301), the imaging apparatus 1 proceeds to perform a process of Step S302. Meanwhile, when the imaging apparatus 1 is not performing the electronic zoom operation (No in Step S301), the imaging apparatus 1 proceeds to perform a process of Step S307.

First, the case where the imaging apparatus 1 is performing the electronic zoom operation (Yes in Step S301) will be described. In such a case, in Step S302, the control unit 28 determines whether the end portion of the image is positioned inside the reference point. In detail, the control unit 28 determines whether the subject is positioned at the center of the image and the face of the subject is enlarged, that is, the face gets out of the screen. When the end portion of the image is positioned inside the reference point (Yes in Step S302), the control unit 28, in Step S303, gradually reduces the image by causing the electronic zoom unit 281 to perform the electronic zoom operation), and, in Step S304, determines whether the end portion of the image has reached the reference point. In detail, as illustrated in (d) of FIG. 8, the control unit 28 determines whether the end portion of the image E4 has reached the reference point K1. When the end portion of the image has reached the reference point (Yes in Step S304), the control unit 28 returns the imaging apparatus 1 to the main routine. Meanwhile, when the end portion of the image has not reached the reference point (No in Step S304), the imaging apparatus 1 returns to Step S303, and the control unit 28 gradually reduces the image by causing the electronic zoom unit 281 to perform the electronic zoom operation.

Meanwhile, when the end portion of the image is not positioned inside the reference point (No in Step S302), in Step S305, the control unit 28 gradually reduces the image by causing the electronic zoom unit 281 to perform the electronic zoom operation. In detail, as illustrated in (b) to (d) of FIG. 8, the control unit 28 gradually reduces the image through the electronic zoom of the electronic zoom unit 281 such that the image E2 is obtained from the image E3 and the image E4. Consequently, a user can smoothly return to an image that has not yet enlarged through the electronic zoom operation of the electronic zoom unit 281.

Then, in Step S306, the control unit 28 determines whether the start position of the electronic zoom has reached. In detail, as illustrated in (b) of FIG. 8, the control unit 28 determines whether the image, generated with an angle of view at the start position at the timing at which the optical zoom has changed to the electronic zoom, has been reduced. When the start position of the electronic zoom has reached (Yes in Step S306), the control unit 28 returns the imaging apparatus 1 to the main routine. Meanwhile, when the start position of the electronic zoom has not reached (No in Step S306), the imaging apparatus 1 returns to Step S305 so that the electronic zoom unit 281 performs the electronic zoom operation to continuously reduce the image.

Next, the case where the imaging apparatus 1 is not performing the electronic zoom operation (No in Step S301) will be described. In such a case, in Step S307, the control unit 28 determines whether the face of the subject is positioned inside the center of the image. When the face of the subject is positioned inside the center of the image (Yes in Step S307), the control unit 28, in Step S308, gradually reduces the image by causing the lens unit 3 to perform the optical zoom operation, and, in Step S309, determines whether a zoom start position when the lens manipulation unit 34 has been manipulated has reached. In detail, as illustrated in (a) of FIG. 8, the control unit 28 determines the presence or absence of the start image E1 generated at the zoom start position when the lens manipulation unit 34 has been manipulated. When the zoom start position when the lens manipulation unit 34 has been manipulated has reached (Yes in Step S309), the control unit 28 returns the imaging apparatus 1 to the main routine. Meanwhile, when the zoom start position when the lens manipulation unit 34 has been manipulated has not reached (No in Step S309), the imaging apparatus 1 returns to Step S308 so that the lens unit 3 performs the optical zoom operation to continuously reduce the image.

Meanwhile, when the face of the subject is not positioned inside the center of the image (No in Step S307), the control unit 28, step S310, gradually reduces the image by causing the lens unit 3 to perform the optical zoom operation, and, in Step S311, determines whether the optical zoom has reached a predetermined magnification. When the optical zoom has reached the predetermined magnification (Yes in Step S311), the control unit 28 returns the imaging apparatus 1 to the main routine. Meanwhile, when optical zoom has not reached the predetermined magnification (No in Step S311), the imaging apparatus 1 returns to Step S310 so that the lens unit 3 performs the optical zoom operation to continuously reduce the image.

According to the first embodiment as described above, when the setting unit 282 sets the enlargement area to be enlarged in the image corresponding to the image data generated by generated by the imaging unit 21 and the reference point calculated by the reference point calculation unit 283 has reached the end portion of an image optically zoomed according to the manipulation signal received by the lens manipulation unit 34, the control unit 28 performs the control of stopping the optical zoom by the lens manipulation unit 34 and of starting the operation of the electronic zoom unit 281, and the control of generating the image data of the image, which employs the enlargement area as the entire area during or after the operation of the electronic zoom unit 281, while moving the enlargement area around the center of the image. As a result, a user can capture a moving image in a desired area through a simple manipulation without performing a difficult manipulation during a capturing operation.

So far, for the purpose of convenience, the electronic zoom and the optical zoom are controlled to be separately switched. However, the optical zoom and the electronic zoom may be simultaneously controlled.

Second Embodiment

Hereinafter, the second embodiment of the invention will be described. In the first embodiment described above, the trimming of the electronic zoom unit is controlled such that the reference point, set when an image is enlarged through the electronic zoom operation, is positioned at the end portion of the image, thereby generating the image data of an image employing an enlargement area as an entire area while moving the enlargement area toward the center of the image. However, in the second embodiment, when an image is enlarged through the electronic zoom operation, after the image data of an image employing an enlargement area as an entire area is generated, the trimming of the electronic zoom unit is controlled such that the reference point is positioned at the end portion of the image, thereby generating the image data of an image in which a subject moves around the center of the image. In addition, an imaging apparatus of the second embodiment has the same configuration as that of the imaging apparatus 1 of the first embodiment, except for the zoom-up control process in the moving image capturing mode. In this regard, only the zoom-up control process in the moving image capturing mode performed by the imaging apparatus 1 according to the second embodiment will be described.

Figure 11:
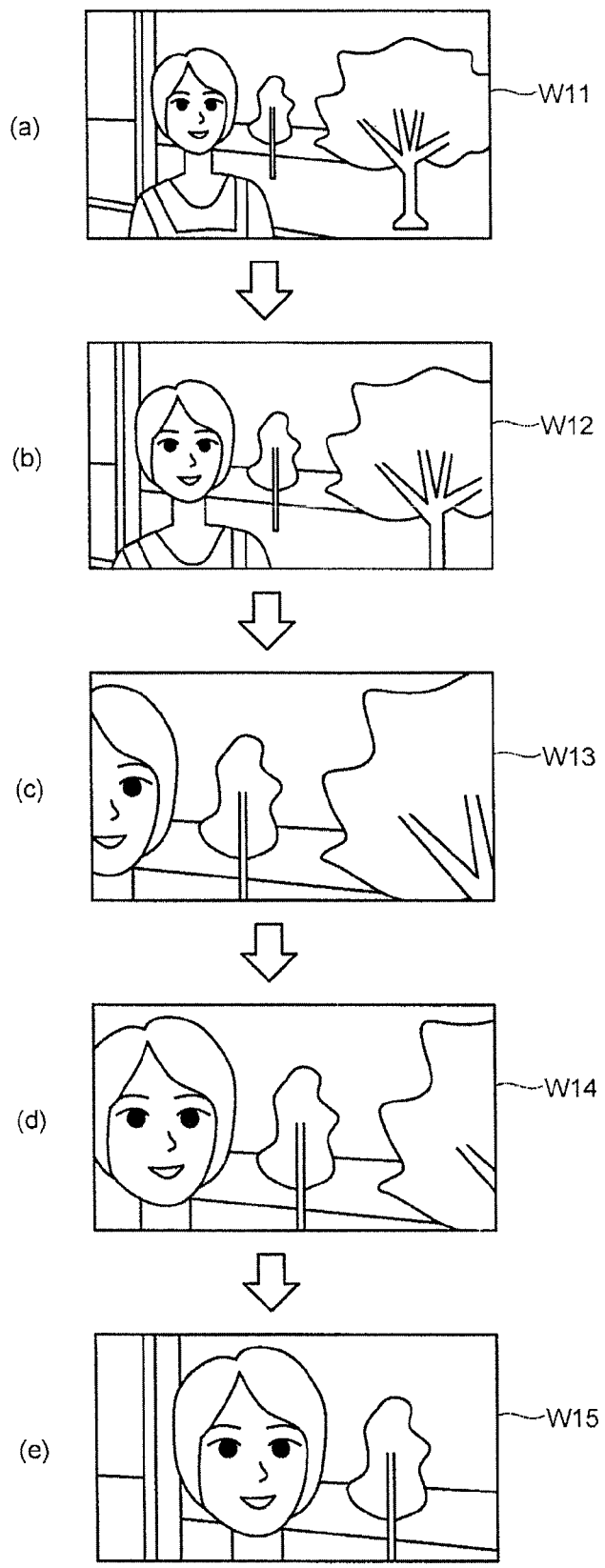
FIG. 11 shows an example of a screen displayed on a display unit in a zoom-up control process performed in a moving image capturing mode of an imaging apparatus according to a second embodiment of the invention.

FIG. 11 shows an example of a screen displayed on the display unit in the zoom-up control process performed in the moving image capturing mode of the imaging apparatus 1 according to the second embodiment of the invention. FIG. 11 illustrates representative five images W11 to W15 among a plurality of images displayed on the display unit 26 when the imaging apparatus 1 performs a zoom operation on a subject in the moving image capturing mode. In addition, between the images W11 to W15, multiple images exist.

As illustrated in FIG. 11, in the imaging apparatus 1, when a user manipulates the lens manipulation unit 34 during moving image capturing, a zoom-up operation is performed, so that the moving image is enlarged to have a predetermined size through the zooming of the moving image ((a) (b) of FIG. 11), and the center (the center of an optical axis of the lens unit 3) of the image is further enlarged ((c) of FIG. 11). Then, the imaging apparatus 1 moves the subject around the center of the image ((c) (d) (e) of FIG. 11). Consequently, when performing the zoom operation during the moving image capturing, a user can capture a moving image in which a subject is arranged around the center of an image only by manipulating the lens manipulation unit 34 without aligning the direction of the imaging apparatus 1 with the subject.

Figure 12:
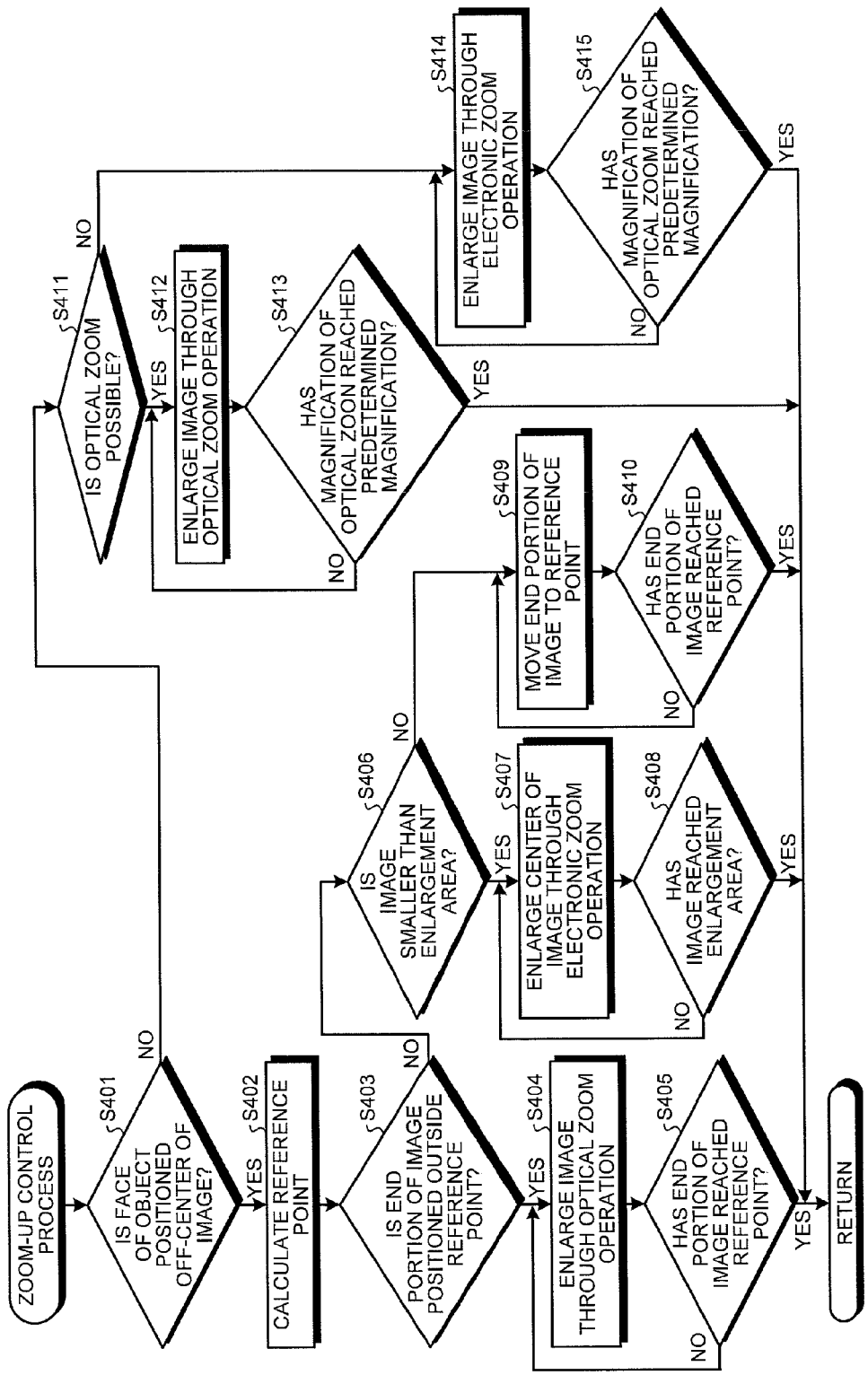
FIG. 12 is a flowchart illustrating the overview of a zoom-up control process of the imaging apparatus according to the second embodiment of the invention.
Figure 13:
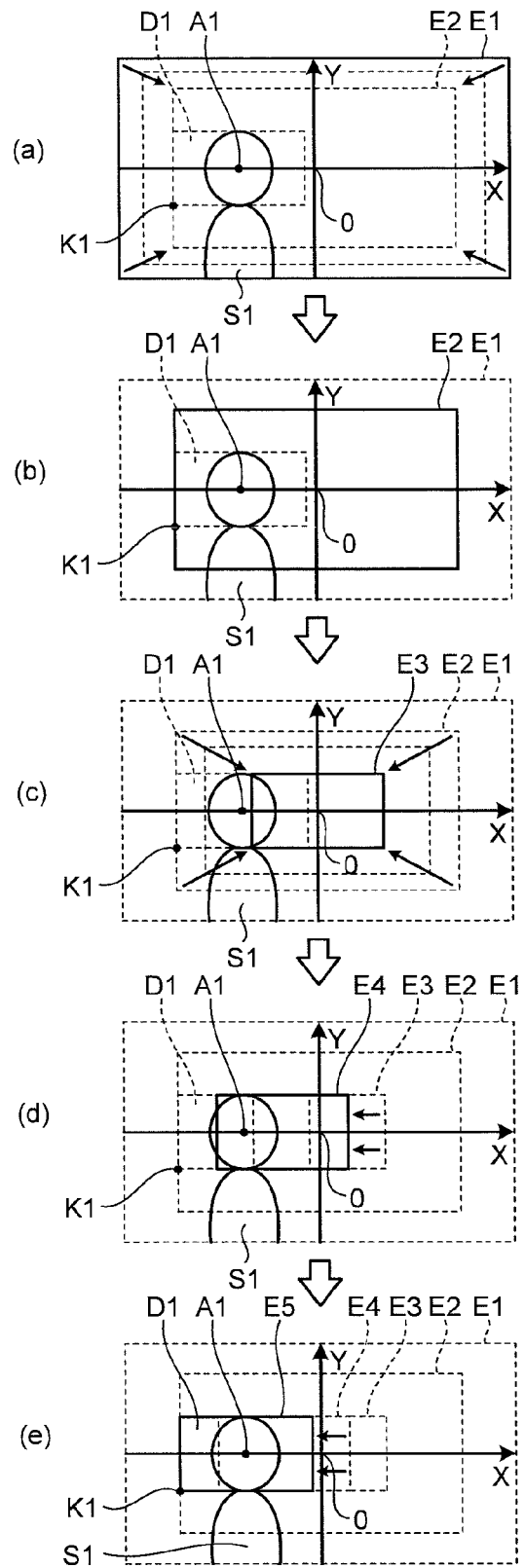
FIG. 13 shows diagrams explaining a zoom-up control process of the imaging apparatus according to the second embodiment of the invention.

Next, the zoom-up control process performed in the moving image capturing mode of the imaging apparatus 1 according to the second embodiment will be described. FIG. 12 is a flowchart illustrating the overview of the zoom-up control process performed in the moving image capturing mode of the imaging apparatus 1 according to the second embodiment. FIG. 13 shows diagrams explaining the zoom-up control process of the imaging apparatus 1 according to the second embodiment.

As illustrated in FIG. 12, the control unit 28, in Step S401, determines whether the face of a subject is positioned outside the center of an image. In detail, as illustrated in FIG. 13, the control unit 28 determines whether the face of the subject S1 is positioned outside the center of the start image E1. When the face of the subject is positioned outside the center of the image (Yes in Step S401), the imaging apparatus 1 proceeds to perform a process of Step S402. Meanwhile, when the face of the subject is not positioned outside the center of the image (No in Step S401), the imaging apparatus 1 proceeds to perform a process of Step S411.

First, the case where the face of the subject is positioned outside the center of the image (Yes in Step S401) will be described. In such a case, based on the start image, which corresponds to the image data generated at the position at which the input of the manipulation signal by the lens manipulation unit 34 has started, and the enlargement area set by the setting unit 282, in Step S402, the reference point calculation unit 283 calculates the reference point passing through the end portion of the area generated by the imaging unit 21 when the electronic zoom unit 281 starts to operate in the start image.

Next, the control unit 28, in Step S403, determines whether the end portion of an image to be sequentially enlarged according to the manipulation content of the lens manipulation unit 34 is positioned outside the reference point. In detail, as illustrated in (a) of FIG. 13, the control unit 28 determines whether the end portion of the start image E1 is positioned outside the reference point K1. When the end portion of the image is positioned outside the reference point (Yes in Step S403), the control unit 28, in Step S404, causes the lens unit 3 to perform an optical zoom operation at the zoom speed calculated by the speed calculation unit 285, thereby performing control of gradually enlarging the image corresponding to the image data generated by the imaging unit 21 such that the image reaches the target image E2 ((a) of FIG. 13).

Then, the control unit 28, in Step S405, determines whether the end portion of the image sequentially enlarged has reached the reference point. In detail, as illustrated in (b) of FIG. 13, the control unit 28 determines whether the end portion of the image E2 has reached the reference point K1. When the end portion of the image sequentially enlarged has reached the reference point (Yes in Step S405), the control unit 28 controls the lens unit 3 to stop the optical zoom operation, and the imaging apparatus 1 returns to the main routine. Meanwhile, when the end portion of the image sequentially enlarged has not reached the reference point (No in Step S405), the imaging apparatus 1 returns to Step S404 so that the lens unit 3 performs the optical zoom operation to continuously enlarge the image.

Next, the case where the end portion of the image to be sequentially enlarged according to the manipulation content of the lens manipulation unit 34 is not positioned outside the reference point (No in Step S403) will be described. In such a case, the control unit 28, in Step S406, determines whether the image is smaller than the enlargement area. In detail, as illustrated in (b) of FIG. 13, the control unit 28 determines whether the image E2 is smaller than the enlargement area D1 (the facial area D1 of FIG. 9). When the image is smaller than the enlargement area (Yes in Step S406), the control unit 28, in Step S407, gradually enlarge the center of the image by causing the electronic zoom unit 281 to perform the electronic zoom operation at the zoom speed calculated by the speed calculation unit 285. In detail, as illustrated in (b) and (c) of FIG. 13, the control unit 28 controls the trimming of the electronic zoom unit 281, and gradually enlarges the image such that the image E3 is obtained from the image E2, thereby generating the image data of an image employing the optical axis of the lens unit 3 as the center.

Then, the control unit 28, in Step S408, determines whether the image has reached the enlargement area. In detail, as illustrated in (c) of FIG. 13, the control unit 28 determines whether the image E3 generated by the electronic zoom unit 281 has reached a size corresponding to the enlargement area. When the image has reached the size corresponding to the enlargement area (Yes in Step S408), the control unit 28 returns the imaging apparatus 1 to the main routine. Meanwhile, when the image has not reached the size corresponding to the enlargement area (No in Step S408), the imaging apparatus 1 returns to step S407 so that the electronic zoom unit 281 performs the electronic zoom operation to continuously enlarge the image.

Meanwhile, when the image is not smaller than the enlargement area (No in Step S406), the control unit 28, in Step S409, moves the end portion of the image to the reference point. In detail, as illustrated in (d) and (e) of FIG. 13, the control unit 28 controls the trimming of the electronic zoom unit 281 such that the image E5 is obtained from the image E3 and the image E4, and generates the image data of an image while gradually moving the image such that the end portion of the image reaches the reference point K1.

Then, the control unit 28, in Step S410, determines whether the end portion of the image has reached the reference point. In detail, as illustrated in (e) of FIG. 13, the control unit 28 determines whether the image E5 generated by the electronic zoom unit 281 has reached the reference point K1. When the image has reached the reference point (Yes in Step S410), the control unit returns the imaging apparatus 1 to the main routine. Meanwhile, when the image has not reached the reference point (No in Step S410), the imaging apparatus 1 returns to Step S409 so that the electronic zoom unit 281 continues trimming by performing the electronic zoom operation.

Next, the case where the face of the subject is not positioned outside the center of the image (No in Step S401) will be described. In such a case, the control unit 28, in Step S411, determines whether optical zoom is possible. When the optical zoom is possible (Yes in Step S411), the control unit 28, in Step S412, gradually enlarges the image by causing the lens unit 3 to perform the optical zoom operation based on the manipulation amount of the lens manipulation unit 34 and the zoom speed calculated by the speed calculation unit 285, and determines whether the optical zoom has reached a predetermined magnification. When the optical zoom has reached the predetermined magnification (Yes in Step S413), the control unit 28 returns the imaging apparatus 1 to the main routine. Meanwhile, when the optical zoom has not reached the predetermined magnification (No in Step S413), the imaging apparatus 1 returns to step S412 so that the lens unit 3 performs the optical zoom operation to continuously enlarge the image.

Meanwhile, when the optical zoom is not possible (No in Step S411), the control unit 28, in Step S414, gradually enlarges the image by causing the electronic zoom unit 281 to perform the electronic zoom operation based on the manipulation amount of the lens manipulation unit 34 and the zoom speed calculated by the speed calculation unit 285, and, in Step S415, determines whether the electronic zoom has reached a predetermined magnification. When the electronic zoom has reached the predetermined magnification (Yes in Step S415), the control unit 28 returns the imaging apparatus 1 to the main routine. Meanwhile, when the electronic zoom has not reached the predetermined magnification (No in Step S415), the imaging apparatus 1 returns to Step S414 so that the electronic zoom unit 281 performs the electronic zoom operation to continuously enlarge the image.

According to the second embodiment described above, similarly to the first embodiment, it is possible to capture a moving image in a desired area through a simple manipulation, for example, a moving image employing a subject as the center of the image, without performing a difficult manipulation when capturing the subject. In addition, it is possible to perform a smooth zoom operation with respect to a subject.

Figure 14:
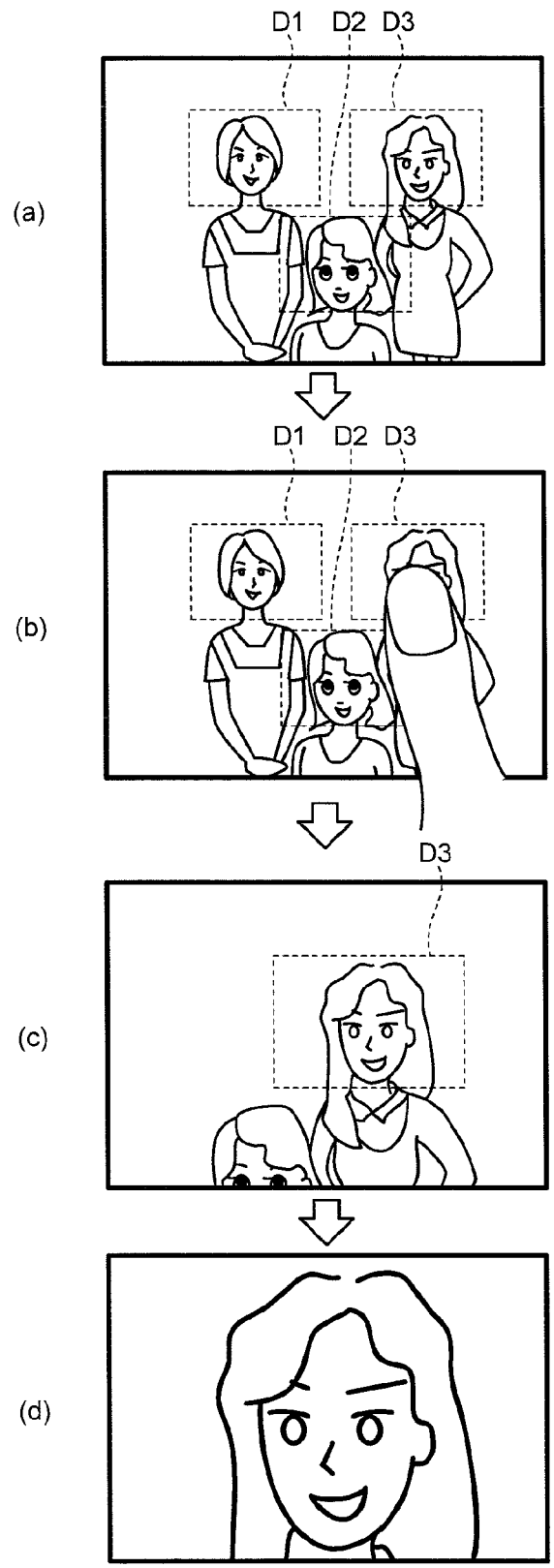
FIG. 14 shows diagrams illustrating the state in which a plurality of subjects are selected according to a modification of an embodiment of the invention.

Moreover, according to the invention, when the face detection unit 284 has detected the faces of a plurality of subjects, a user may be given a selection of desired subjects by touching the touch panel 27 with own finger. For example, as illustrated in FIG. 14, in the case where the face detection unit 284 has detected the faces of a plurality of subjects (facial areas D1 to D3 in (a) of FIG. 14), when a user has touched a facial area D3 of the subject with the index finger of the right hand ((b) of FIG. 14), the setting unit 282 sets an area including the touched facial area D3 of the subject as an enlargement area. Then, the control unit 28 moves the enlargement area D3 toward the center of the enlargement area generated by the electronic zoom unit 281 ((c) of FIG. 14). Consequently, although a plurality of subjects exist in an image, it is possible to select a desired subject, and capture the subject by moving the desired subject toward the center of an image while performing a zoom operation during moving image capturing ((d) of FIG. 14).

Figure 15:
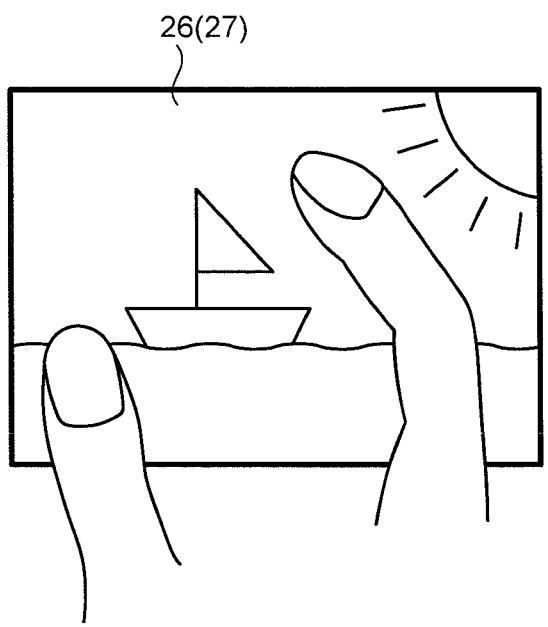
FIG. 15 is a diagram illustrating a touch position of a finger of the right hand of a user according to a modification of an embodiment of the invention.
Figure 16:
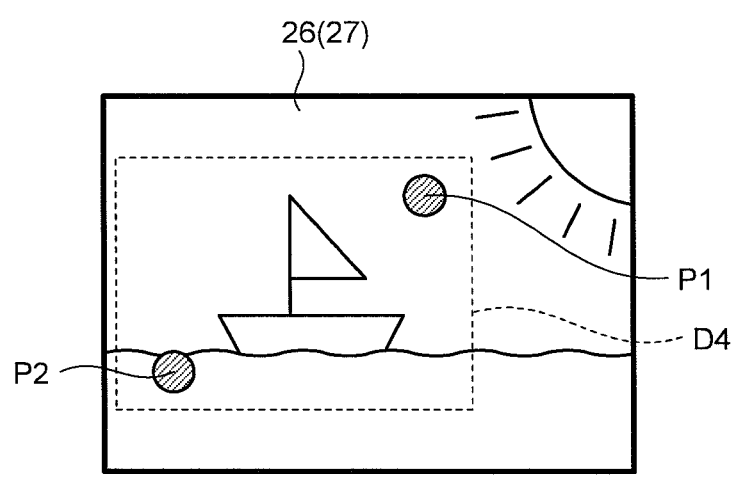
FIG. 16 is a diagram illustrating an enlargement area set by a setting unit according to the touched position in FIG. 15.

Furthermore, in the invention, the setting unit 282 can set an enlargement area according to a contact position on the touch panel 27 of a subject from an outside. For example, as illustrated in FIG. 15, a user touches the touch panel 27 with two fingers (the thumb and the index fingers in FIG. 15) of the right hand before performing a zoom operation, thereby designating the positions on a diagonal of an area to be zoomed. Next, as illustrated in FIG. 16, the setting unit 282 sets an enlargement area D4, which includes areas P1 and P2 touched by the two fingers, such that the areas P1 and P2 are positioned in the vicinity of the diagonal and an aspect ratio is identical to the aspect ratio of the display unit 26. In addition, in the invention, the setting unit 282 can set an enlargement area by causing only one finger to make contact with the touch panel 27. For example, when a user has touched the touch panel 27 with the index finger of the right hand, the setting unit 282 may set an area of a predetermined size including a portion touched by the index finger. In such a case, the control unit 28 may determine whether the touch panel 27 has been touched, instead of the face detection of step S108 illustrated in FIGS. 5A and 5B. Consequently, it is possible to capture a moving image by enlarging a desired area although no person (a subject) exists in an image captured by the imaging apparatus 1 during moving image capturing.

Furthermore, in the invention, the setting unit 282 may set an in-focus area as an enlargement area. For example, the setting unit 282 may set an in-focus area in the image generated by the imaging unit 21, as an enlargement area.

Furthermore, in the invention, after the lens manipulation unit 34 has been manipulated, the imaging apparatus 1 performs a zoom operation. However, it may be possible to perform the zoom operation of the imaging apparatus 1 using the zoom switch 223 provided to the body unit 2.

Figure 17:
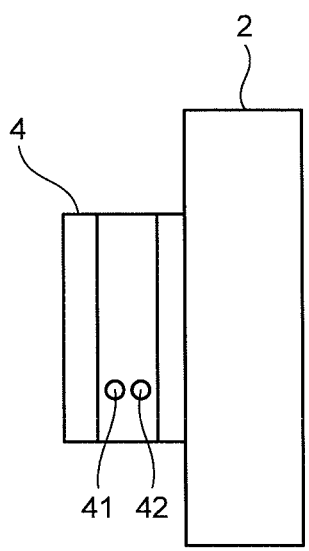
FIG. 17 is a diagram illustrating another example of the configuration example of a lens manipulation unit.

Furthermore, in the invention, a focusing ring may be applied as the lens manipulation unit 34, instead of a zoom ring. In addition, as the lens manipulation unit 34, two switches 41 and 42 may be provided at the peripheral portion of a lens unit 4 as illustrated in FIG. 17. The two switches 41 and 42 correspond to two rotation directions of a zoom ring when the zoom ring is used as the lens manipulation unit 34, respectively. In detail, the switch 41 has a zoom-up operation function and the switch 42 has a zoom-down operation function. At this time, the speed calculation unit 285 may calculate the zoom speed of the imaging apparatus 1 based on the manipulation times of the switches 41 and 42.

Furthermore, in the invention, in the moving image capturing mode, the image data of an image is generated, which employs a subject as an entire area while moving the subject around the center of the image. However, the invention is not limited thereto. The imaging apparatus 1 of the invention also performs a general moving image capturing mode.

Furthermore, in the invention, the control unit 28 time-sequentially switches between the optical zoom and the electronic zoom step by step. However, the optical zoom and the electronic zoom may be instantaneously switched.

Furthermore, in the invention, when the optical zoom is switched to the electronic zoom, the control unit 28 may enlarge an image without stopping the optical zoom performed by the lens unit 3.

In addition, in the invention, the lens unit 3 is detachably coupled to the body unit 2. However, for example, the lens unit 3 may be integrally formed with the body unit 2.

Moreover, in the invention, the imaging apparatus 1 has been described as a digital single-lens reflex camera. However, for example, the invention may also be applied to a digital video camera, a mobile phone, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
   a lens unit that collects light from a subject, the lens unit having an optical zoom function of optically changing an angle of view;
   an imaging unit that continuously generates electronic image data using the light collected by the lens unit;
   an electronic zoom unit that performs electronic zoom by sequentially trimming and enlarging or reducing an image corresponding to the image data generated by the imaging unit;
   a setting unit that sets an enlargement area to be enlarged in the image;
   a zoom manipulation unit that receives a manipulation signal for changing the angle of view through the lens unit;
   a reference point calculation unit that calculates a reference point passing through an end portion of an area generated by the imaging unit when the electronic zoom unit starts to perform a zoom operation in a start image, wherein the start image corresponds to the image data generated when the input of the manipulation signal by the lens manipulation unit has started; and
   a control unit that (1) successively detects a position of the enlargement area relative to the image in accordance with the manipulation signal received by the zoom manipulation unit, (2) performs continuous control of switching interchangeably between (A) enlargement of a center of the image by the optical zoom of the lens unit and (B) enlargement of the enlargement area by the electronic zoom of the electronic zoom unit, in accordance with the detected position of the enlargement area relative to the image when zooming up the image, and (3) responsive to a determination that both (i) the image is not smaller than the enlargement area and (ii) the end portion of the image is not positioned outside the reference point, moves the end portion of the image towards the reference point.

2. The imaging apparatus according to claim 1, further comprising a display unit that displays an image corresponding to the image data.

3. The imaging apparatus according to claim 2, wherein the control unit switches between the optical zoom performed by the lens unit and the electronic zoom performed by the electronic zoom unit, based on the start image and the enlargement area set by the setting unit.

4. The imaging apparatus according to claim 3, wherein, when the reference point has reached an end portion of an image optically zoomed according to the manipulation signal received by the lens manipulation unit, the control unit performs control of starting a continuous enlargement operation by the electronic zoom unit following the optical zoom by the lens unit, and control of causing the electronic zoom unit to generate image data of an image, which employs the enlargement area as an entire area during or after the operation of the electronic zoom unit, while moving the enlargement area around a center of the image.

5. The imaging apparatus according to claim 4, wherein the control unit controls trimming of the electronic zoom unit such that the reference point is positioned at the end portion of the image.

6. The imaging apparatus according to claim 5, further comprising:
   a face detection unit that detects a face of a subject included in the image generated by the imaging unit, wherein
   the setting unit sets an area that includes, in the vicinity of the center of the area, a facial area of the subject detected by the face detection unit, as the enlargement area.

7. The imaging apparatus according to claim 6, further comprising:
   a display unit that displays the image generated by the imaging unit or a display image according to the enlargement area generated by the electronic zoom unit; and
   a touch panel that is provided on an image display screen of the display unit and that receives a signal corresponding to a contact position of a subject from an outside,
   wherein, when the face detection unit detects faces of a plurality of subjects, the setting unit sets an area that includes, in the vicinity of the center of the area, a facial area of the subject corresponding to a position of the touch panel which is touched with an object from the outside with respect to the display image displayed on the display unit, as the enlargement area.

8. The imaging apparatus according to claim 7, further comprising:
   a speed calculation unit that calculates a zoom speed of the imaging apparatus based on a manipulation time and a manipulation amount of the lens manipulation unit,
   wherein the control unit controls the speed of the imaging apparatus according to a calculation result of the speed calculation unit.

9. The imaging apparatus according to claim 8, wherein the lens unit includes
   the lens manipulation unit; and
   a lens control unit that controls an optical zoom operation based on an input signal received by the lens manipulation unit,
   wherein the lens unit is detachably coupled to a body unit of the imaging apparatus and is able to communicate with the body unit.

10. The imaging apparatus according to claim 1,
    wherein, after an image employing the enlargement area as an entire area is generated, the control unit controls trimming of the electronic zoom unit such that a reference point is positioned at an end portion of the image.

11. The imaging apparatus according to claim 10, further comprising:
    a face detection unit that detects a face of a subject included in the image generated by the imaging unit,
    wherein the setting unit sets an area that includes, in the vicinity of the center of the area, a facial area of the subject detected by the face detection unit, as the enlargement area.

12. The imaging apparatus according to claim 11, further comprising:
    a display unit that displays the image generated by the imaging unit or a display image according to the enlargement area generated by the electronic zoom unit; and a touch panel that is provided on an image display screen of the display unit and that receives a signal corresponding to a contact position of a subject from an outside, wherein, when the face detection unit detects faces of a plurality of subjects, the setting unit sets an area that includes, in the vicinity of the center of the area, a facial area of the subject corresponding to a position of the touch panel which is touched with an object from the outside with respect to the display image displayed on the display unit, as the enlargement area.

13. The imaging apparatus according to claim 12, further comprising:

a speed calculation unit that calculates a zoom speed of the imaging apparatus based on a manipulation time and a manipulation amount of the lens manipulation unit, wherein the control unit controls the speed of the imaging apparatus according to a calculation result of the speed calculation unit.

14. The imaging apparatus according to claim 13, wherein the lens unit includes the lens manipulation unit; and a lens control unit that controls an optical zoom operation based on an input signal received by the lens manipulation unit, wherein the lens unit is detachably coupled to a body unit of the imaging apparatus and is able to communicate with the body unit.

15. A method comprising:

collecting light from a subject using a lens unit having an optical zoom function of optically changing an angle of view;

continuously generating electronic image data using the light collected by the lens unit;

performing electronic zoom by sequentially trimming and enlarging or reducing an image corresponding to the image data generated by the imaging unit;

setting an enlargement area to be enlarged in the image;

receiving a zoom manipulation signal for changing the angle of view through the lens unit;

successively detecting a position of the enlargement area relative to the image in accordance with the zoom manipulation signal received;

calculating a reference point passing through an end portion of an area generated by the imaging unit when performance of the electronic zoom starts in a start image, wherein the start image corresponds to the image data generated when the zoom manipulation signal is received;

performing continuous control of switching interchangeably between (A) enlargement of a center of the image by the optical zoom of the lens unit and (B) electronic enlargement of the enlargement area, in accordance with the detected position of the enlargement area relative to the image when zooming up the image; and moving the end portion of the image towards the reference point responsive to a determination that both (i) the image is not smaller than the enlargement area and (ii) the end portion of the image is not positioned outside the reference point.

16. The method of claim 15 further comprising:

performing, when zooming down the image, continuous control of switching between reduction of the image by the optical zoom of the lens unit and reduction of the image by the electronic zoom in accordance with the switching previously performed when zooming up the image.

17. The imaging apparatus of claim 1 wherein the control unit further performs, when zooming down the image, continuous control of switching between reduction of the image by the optical zoom of the lens unit and reduction of the image by the electronic zoom of the electronic zoom unit in accordance with the switching previously performed when zooming up the image.

* * * * *